United States Patent [19]

Imazeki

[11] 3,794,925

[45] Feb. 26, 1974

[54] FREQUENCY-SKIPPING SYSTEM FOR A SIGNAL-SEEKING RECEIVER

[75] Inventor: Kazuyoshi Imazeki, Tokyo, Japan

[73] Assignee: General Research of Electronics, Inc., Chicago, Ill.

[22] Filed: June 27, 1972

[21] Appl. No.: 266,712

[52] U.S. Cl. .................. 325/470, 325/335, 325/464

[51] Int. Cl. .............................................. H04b 1/32

[58] Field of Search .................... 325/416–418, 420, 325/452, 453, 470, 334, 335, 464; 343/205, 206

[56] References Cited

UNITED STATES PATENTS

| | | | |
|---|---|---|---|
| 3,714,585 | 1/1973 | Koch | 325/335 |
| 3,665,318 | 5/1972 | Hoffman et al. | 325/334 |

*Primary Examiner*—Robert L. Griffin
*Assistant Examiner*—Marc E. Bookbinder
*Attorney, Agent, or Firm*—Fitch, Even, Tabin & Luedeka

[57] ABSTRACT

A frequency-skipping system is provided for a signal-seeking receiver which automatically tunes the receiver to one of a plurality of predetermined frequencies whenever a signal corresponding to one of the predetermined frequencies is received. A scanning circuit causes the receiver to automatically scan a plurality of predetermined frequencies and tune to a received signal having a frequency corresponding to one of the predetermined frequencies. A switching network is operable to cause the scanning circuit to skip those frequencies which the operator does not want to monitor.

1 Claim, 1 Drawing Figure

PATENTED FEB 26 1974 3,794,925
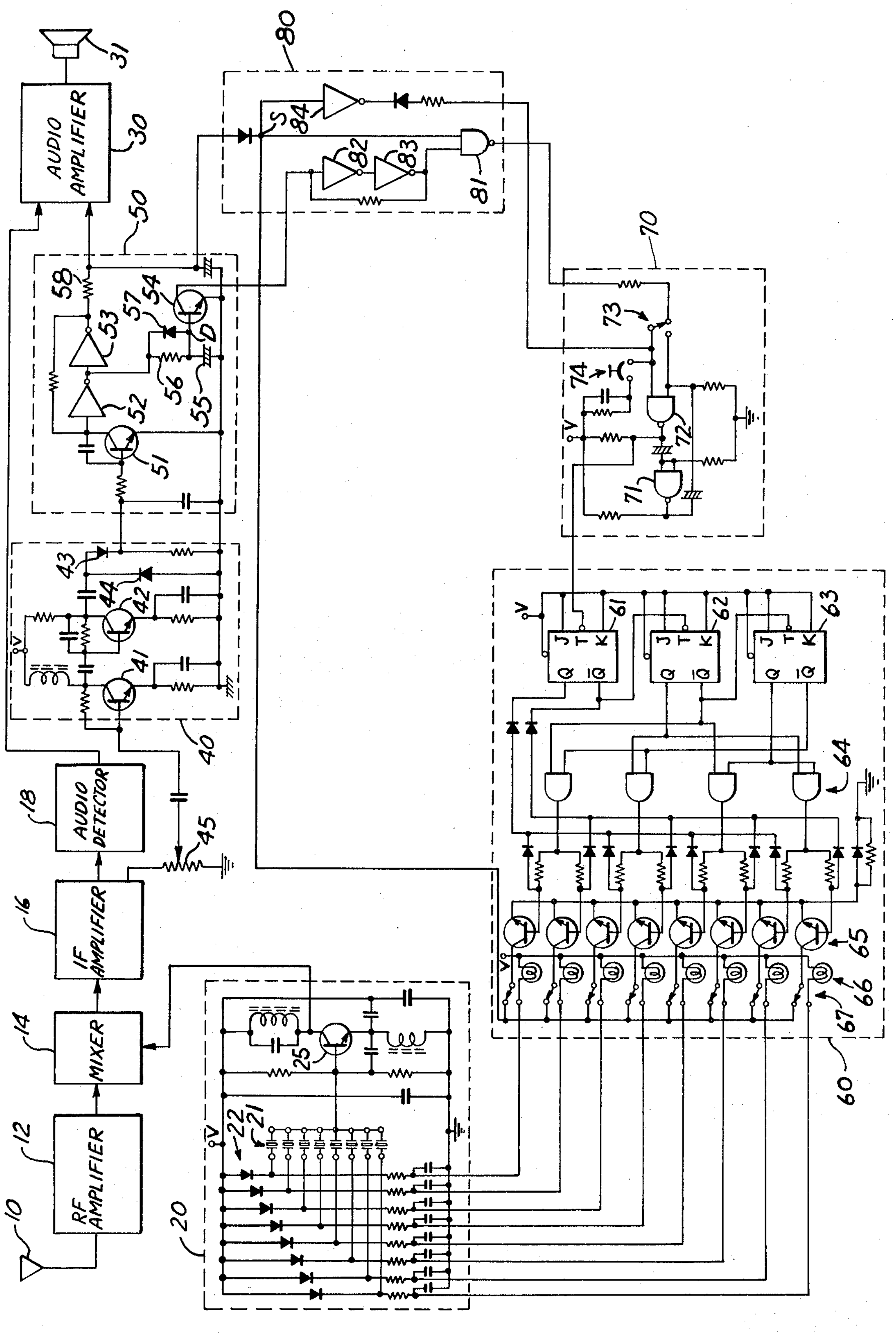

FREQUENCY-SKIPPING SYSTEM FOR A SIGNAL-SEEKING RECEIVER

The present invention generally relates to signal-seeking receivers and, more particularly, relates to such receivers which scan a predetermined plurality of frequencies and automatically tune to a received signal having a frequency corresponding to one of the predetermined frequencies.

Signal-seeking receivers are well-known for their convenience in automatically tuning to any one of a plurality of frequencies such as those corresponding to television channels, broadcast radio stations, or two-way communication channels. With the advent of solid-state electronic circuitry, conventional signal-seeking receivers have been developed which generally operate more efficiently and accurately than predecessor systems employing an electric motor or series of relays for varying the tuning portion of the receiver.

One particularly attractive application for a signal-seeking receiver is in a two-way communication system having a plurality of frequencies or channels. In such a system, a signal-seeking receiver enables the listener to monitor all of the stations without having to continuously tune the receiver manually to each of the stations. Moreover, the signal-seeking feature is especially convenient for a mobile two-way communication receiver because the listener often has his hands occupied.

One difficulty with such a system, however, is that in some situations the operator may not be interested in receiving one or more of the channels. Unless some provision is made for skipping these undesired channels, the system automatically tunes the receiver to them whereupon the operator must either listen to the undesired channel until it goes off the air or manually advance the receiver to the next channel. In those conventional signal-seeking receivers which do provide for channel skipping, the circuitry is relatively complex and expensive and has the further disadvantage of requiring almost as much time to skip a channel as that required to tune to, and through, that channel, In a system having ten or more channels of which only two or three are of interest to a particular operator, a relatively substantial amount of time is lost tuning through the "skipped" channels.

It is therefore an object of the invention to provide an improved signal-seeking receiver having a system for automatically skipping an undesired frequency or channel.

It is another object of the invention to provide such a system which is relatively simple and economical to construct and is adaptable to a multi-frequency system in which any one or more of the frequencies may be selectively skipped.

Other objects and advantages of the invention are more particularly set forth in the following detailed description, and in the accompanying drawings, the single FIGURE of which is an electrical schematic diagram of a specific embodiment of a signal-seeking receiver having a frequency-skipping system constructed in accordance with the principles of the present invention.

With reference to the FIGURE, generally, the illustrated embodiment of the receiver comprises an antenna 10 for receiving a plurality of signals each having a frequency corresponding to one of a plurality of predetermined frequencies and for applying equivalent electrical signals to a suitable RF amplifier 12. It should be noted that, although the invention is described in a two-way communications environment, the principles of the invention are also applicable to other electromagnetic-radiation communication systems such as broadcast radio and television systems. The output of RF amplifier 12 is coupled to the input of a superheterodyne mixer 14 which is responsive to the output signal from a variable-frequency local oscillator circuit 20 for developing an intermediate frequency which is applied to an IF amplifier 16. The audio intelligence signal is developed by an audio detector 18 of a type suitable for the particular type of signal the receiver is designed to receive (e.g., AM, FM, pulse-code modulation, etc.). The audio output signal from audio detector 18 is coupled to an audio amplifier 30 for ultimate reproduction by a loudspeaker 31. The circuitry thus far described is essentially conventional and forms no part of the present invention and therefore is discussed herein only briefly.

A signal detecting means 40 is responsive to the reception of a signal having a frequency corresponding to one of the predetermined frequencies to develop a control signal indicative thereof. The control signal is coupled to audio amplifier 30 by means of a threshold switching circuit 50 to disable or mute audio amplifier 30 when the receiver is not receiving a desired signal so that annoying, non-intelligent sounds are not reproduced by loudspeaker 31. This muting operation is often referred to as "squelching".

A variable tuning means in the form of a variable-frequency local oscillator circuit 20 is operable to selectively tune the receiver to the aforementioned predetermined frequencies. Oscillator circuit 20 comprises a plurality of piezoelectric crystal tuning elements 21 which are adapted to be individually and operatively connected into oscillating circuit 20 which further comprises an oscillating transistor 25. A scanning means in the form of a digital logic sequential switching circuit 60 is coupled to oscillating circuit 20 to effectively connect each of crystal tuning elements 21 individually into the oscillating circuit. A clock circuit 70 is used to generate a timing signal which drives sequential switching circuit 60 at a predetermined scanning rate. The scanning operation is stopped by a gating means in the form of a digital logic circuit 80 which is responsive to the control signal developed by signal detector 40 for stopping the generation of the timing signal by clock circuit 70. Logic circuit 80 thus disables clock 70 and thereby stops sequential switching circuit 60 such that the particular one of the crystals 21 which caused oscillator 20 to tune the receiver to the frequency of the received signal remains connected in the oscillating circuit to thus maintain the receiver tuned to that received signal.

In accordance with the illustrated embodiment of the invention, a frequency-skipping network is provided comprising a plurality of selector switches 67 and digital logic switching circuit 60 to select any particular one or more of the predetermined frequencies to be skipped. As illustrated in the FIGURE, all of selector switches 67 are in the "skip" position. The operator (not shown), therefore, need only switch thos selector switches corresponding to the frequencies of the desired monitored stations to the opposite or "receive" position. When sequential switching circuit 60 scans a crystal tuning element corresponding to a frequency to be skipped, a logic signal is applied to circuit 80 which in turn causes clock circuit 70 to apply a pulse to sequential switching circuit 60 which then advances oscillating circuit 20 one position or frequency.

More particularly, variable-frequency oscillating circuit 20 of the embodiment of the invention shown in the FIGURE includes a conventional oscillating transistor 25 and its associated biasing circuitry together with a plurality of tuning elements 21 which are selectively coupled from the base of oscillating transistor 25 to ground by sequential switching circuit 60. The resonant frequency of the tuning element coupled between the base of oscillating transistor 25 and ground (with respect to AC signals) determines the frequency of oscillation of the circuit. As shown in the illustrated embodiment of the invention, tuning elements 21 comprise a plurality of piezoelectric crystal tuning elements each having a different resonant frequency which, when respectively heterodyned or "mixed" with each predetermined frequency, produces a frequency corresponding to the intermediate frequency of the receiver. The cathodes of a corresponding plurality of diodes 22 are respectively connected to crystals 21, with the anodes being connected to a suitable voltage source V and the cathodes also respectively coupled to the outputs of sequential switching circuit 60 by means of a corresponding plurality of coupling resistors 23. Accordingly, an individual crystal tuning element is operatively connected between the base of transistor 25 and ground by forward biasing its associated diode. Frequency scanning is thus achieved by sequential switching circuit 60 developing a plurality of output voltages that maintain all but one of diodes 22 reversed biased, with a different diode being forward biased with each clock or timing pulse from clock circuit 70.

Sequential switching circuit 60 of the illustrated embodiment of the invention includes three J-K flip-flops 61, 62, and 63 which operate as a counter circuit and which are responsive to the timing signal in the form of clock pulses from clock circuit 70 to apply logic signals to a series of four AND gates 64. Each one of AND gates 64 is operable to enable actuation of one pair of the four pairs of switching transistors collectively designated by reference character 65. The Q and Q outputs from J-K flip-flop 61 alternately enable actuation of each transistor in each transistor pair. Consequently, each one of switching transistors 65 is temporarily actuated in sequence by the coaction of AND gates 64 and flip-flop 62, with the amount of time each switching transistor 65 is actuated being determined by the frequency of the timing signal applied by clock circuit 70. Actuating each of transistors 65 forward biases the corresponding diode 22 in oscillator 20 and also turns on the corresponding one of a series of indicator lights 66, the latter providing a visual indication of the frequency to which the receiver is then tuned. It is understood, of course, that the particular number of switching transistors 65, indicating lamps 66, selector switches 67, and corresponding crystal tuning elements 21 and diodes 22 may be varied without departing from the principles of the invention.

Clock circuit 70 develops a timing or pulse-train signal to drive sequential switching circuit 60 and for this purpose comprises a pair of NAND gates 71 and 72 which are operated as a blocking oscillator. The particular circuit employed for the clock function may, of course, be of any design suitable for developing a pulse-train signal having a repetition rate of approximately 10 Hertz, for example, for application to the trigger or "clock" terminal T of J-K flip-flop circuit 62 of sequential switching circuit 60. A single-pole, double-throw switch 73 is provided for switching the system to either an automatic scanning or a manual scanning operation; as shown in the FIGURE, switch 73 is in the automatic scanning position. When switch 73 is in the manual scanning position, the contact closure of a momentary-contact switch 74 is operable to cause clock 70 to develop a single output pulse which in turn causes sequential switching circuit 60 to shift oscillating circuit 20 one tuning element position or frequency. Thus, the system may be manually sequenced through any number of the frequencies of the system or set to a given one of the frequencies for a period of time, as desired.

To detect the reception of a desired signal, signal detecting means 40 comprises a generally conventional circuit often referred to as a "noise-amplifier squelch" circuit. For this purpose, a pair of amplifying transistors 41 and 42 are used to amplify the non-intelligence or "noise" signal present in the system when the receiver is not receiving a signal having a carrier frequency corresponding to that frequency to which the receiver is then tuned. The collector circuit of transistor 41 is tuned to respond to frequencies other than those of interest (e.g., the intermediate frequency or audio frequencies, depending on where the input signal for signal detector 40 is taken). A pair of diodes 43, 44 convert the amplified AC noise signal to a control signal in the form of a DC voltage which may be utilized to indicate whether or not a desired signal is received (e.g., the control signal is a positive five volts—a digital-logic "high"—when no desired signal is received and is zero volts—a digital-logic "low"—when a desired signal is received). The input to detector 40 may be obtained from any convenient circuit location in the receiver, depending on the frequency of interest and the particular circuitry employed. To vary the sensitivity of the detector, the amplitude of the signal applied thereto may be adjusted by utilizing a potentiometer 45, as shown in the FIGURE, or any suitable equivalent thereof.

In the illustrated embodiment of the invention, threshold circuit 50 is used to couple the control signal from signal detector 40 to audio amplifier 30 to mute the audio amplifier when no desired signal is being received. Although it is not necessary for the operation of the invention, threshold switching circuit 50 is provided in this specific embodiment thereof to modify the control signal to make it more suitable for application to audio amplifier 30 as well as to other parts of the circuit, as described in greater detail below. Threshold switching circuit 50 comprises a switching transistor 51 and a pair of inverters 52, 53 to increase the magnitude of the control signal as well as provide output signal of both the same and the opposite polarity as that of the control signal developed by signal detector 40. These output signals are appropriate for use in the specific embodiment of the invention illustrated in the FIGURE, as also described below in greater detail.

In accordance with an optional aspect of the illustrated embodiment of the invention, threshold circuit 50 further comprises storing or delaying means in the form of a storage capacitor 55, a timing resistor 56, and a diode 57 for temporarily maintaining or storing the control signal for a predetermined period of time (e.g., two seconds) after the termination of the development thereof by signal detector 40 due to a temporary interruption in signal transmission. The signal is applied from the junction of capacitor 55 and diode 57 through a phase-inverting transistor 54 to clock circuit 70 (by means of switching circuit 80, as described below in greater detail) to stop scanning circuit 60 by disabling clock circuit 70. Thus, when the output signal of inverter 52 goes "low" (indicating that a desired signal is being received), the "low" signal is coupled to clock circuit 70 almost instantaneously by diode 57; whereas, when reception of the desired signal terminates, a "high" signal appears at the output of inverter 52 which is blocked by diode 57 and therefore is coupled to clock circuit 70 only after a predetermined amount of time has elapsed, as determined by the time constant of storage capacitor 55 and timing resistor 56. Consequently, upon reception of a desired signal, detector 40 develops a control signal indicative thereof which is coupled to clock circuit 70 to cause scanning circuit 60 to maintain oscillator 20 oscillating at the same frequency, thereby causing the receiver to remain tuned to the frequency of the received signal. Should the transmission of the received signal for some reason be briefly interrupted, however, the delaying circuit of threshold switching circuit 50 will maintain the receiver tuned to the same frequency until transmission is continued (within the range of time determined by the time constant of the delaying circuit), thereby preventing the receiver from being tuned to another frequency during the brief interruption.

In accordance with the illustrated embodiment of the invention, the control signal developed by signal detector 40 is applied to clock circuit 70 by means of digital logic circuit 80. The control signal is obtained at the output of inverter 53 (by way of output resistor 58) where it has a suitable magnitude and polarity for appication to one of the two inputs of NAND gate 81 of logic circuit 80. The other input to NAND gate 81 is obtained from the output of the delay circuit of threshold circuit 50. A pair of inverters 82, 83 increase the magnitude of the signal from phase-inverting transistor 54. When a signal having a frequency corresponding to that to which the receiver is tuned is received, a "high" logic signal is applied to both inputs of NAND gate 81 which results in a "low" logic output signal being applied to clock circuit 70 to stop sequential switching circuit at that position or frequency. If that particular frequency has been selected for skipping, however, in accordance with the illustrated embodiment of the invention, the actuation of the corresponding switching transistor 65 applies a "low" logic signal to terminal S of switching circuit 80 by means of the corresponding selector switch. This "low" logic signal is converted into a "high" logic signal by an inverter 84 and applied to clock circuit 70 to cause it to generate one pulse which advances sequential switching circuit 60 one position, and thus tunes the receiver to the next frequency in the sequence. This operation is repeated until the receiver is tuned to a signal having a frequency corresponding to one of the predetermined frequencies and which has been selected for monitoring by the operation. When such a signal is received, no logic signal is applied to terminal S, thus the clock circuit does not generate a pulse to advance sequential switching circuit 60.

Thus there has been shown and described an improved signal-seeking receiver having a system for automatically skipping an undesired frequency. The system of the invention is relatively simple and economical to construct and is adaptable to a multi-frequency system in which any one or more of the frequencies may be skipped.

It will, of course, be understood that modifications of the present invention, in its various aspects, will be apparent to those skilled in the art, some being apparent only after study, and other being merely matters of routine design. As such, the scope of the invention should not be limited by the particular embodiment and specific construction herein described, but should be defined only by the appended claims, and equivalents thereof.

Various features of the invention are set forth in the following claims.

What is claimed is:

1. In a signal-seeking receiver which automatically scans a plurality of predetermined radio frequencies and tunes to a received signal having a frequency corresponding to one of said predetermined frequencies, a system for selectively skipping any of said predetermined frequencies, comprising:

variable tuning means having a local oscillator circuit operable to selectively oscillate at each of a corresponding plurality of local oscillator frequencies, said local oscillator including a corresponding plurality of tuning elements adapted to be operatively connected into said local oscillator individually;

clock means for generating a timing signal having a predetermined frequency;

sequential switching means responsive to said timing signal for sequentially developing a corresponding plurality of output signals to operatively connect each of said tuning elements into said local oscillator individually and systematically in accordance with the frequency of said timing signal, thereby causing said local oscillator circuit to oscillate sequentially at each of said local oscillator frequencies and at a uniform rate corresponding to said timing signal frequency;

signal detecting means responsive to the reception of a signal having a frequency corresponding to one of said predetermined frequencies for developing a control signal;

a corresponding plurality of selector switches coupled between said sequential switching means and said local oscillator circuit for enabling selection of those of said predetermined frequencies to be skipped and for developing corresponding skip signals;

and a digital logic switching circuit including a NAND gate connected in parallel with the series combination of an inverter and a diode, responsive to said control signal for stopping the generation of said timing signal by said clock means and responsive to said skip signal to override said timing signal and advance said clock means one timing unit so that said sequential means is advanced one step at a faster rate than the frequency of said timing signal.

* * * * *